United States Patent [19]
Brown et al.

[11] 3,914,513
[45] Oct. 21, 1975

[54] SUBSTRATES COATED WITH FIRE RESISTANT COMPOSITIONS

[75] Inventors: Alistair Chalmers Ramsay Brown; Denis George Harold Ballard, both of Runcorn, England

[73] Assignee: Imperial Chemical Industries Limited, London, England

[22] Filed: Nov. 20, 1973

[21] Appl. No.: 417,606

Related U.S. Application Data

[63] Continuation of Ser. No. 309,920, Nov. 27, 1972, abandoned, which is a continuation of Ser. No. 735,561, June 10, 1968, abandoned.

[30] Foreign Application Priority Data
June 15, 1967 United Kingdom............... 27732/67

[52] U.S. Cl. ........... 428/425; 260/28.5 A; 428/513; 428/921
[51] Int. Cl............................................. D21h 1/28
[58] Field of Search..... 117/136, 137, 155 UA, 158; 260/28.5 A, 874, 878 R, 897 R

[56] References Cited
UNITED STATES PATENTS

| | | | |
|---|---|---|---|
| 2,986,478 | 5/1961 | Oatterson | 117/137 |
| 3,333,970 | 8/1967 | Green | 260/28.5 X |
| 3,475,199 | 10/1969 | Wolf | 117/158 X |
| 3,639,304 | 2/1972 | Raley | 260/28.5 X |
| 3,801,335 | 4/1974 | Larson | 260/28.5 X |

*Primary Examiner*—Michael R. Lusignan
*Attorney, Agent, or Firm*—Cushman, Darby & Cushman

[57] ABSTRACT

A coated product comprising a flammable substrate coated with a mixture of (1) a polyolefin selected from the group consisting of polyethylene and polypropylene, (2) from 10–20% by weight of a flame retardant additive comprising a mixture of chlorinated paraffin wax and antimony oxide and (3) from 40–45% by weight of an intumescent material comprising a mixture of pentaerythritol polyurethane with melamine phosphate, the mixture being self-extinguishing and free from drip of molten polyolefin when a direct flame is applied thereto.

2 Claims, No Drawings

SUBSTRATES COATED WITH FIRE RESISTANT COMPOSITIONS

This is a continuation of application Ser. No. 309,920, filed Nov. 27, 1972 now abandoned, which is itself a continuation of Ser. No. 735,561, filed June 10, 1968, now abandoned.

This invention relates to fire resistant compositions, and especially to fire resistant compositions containing thermoplastic polymeric materials.

Many potential applications of thermoplastic polymeric materials are limited by the inherent inflammability of the polymers, and their ability to spread flame over their surface. Certain additives are known which may be mechanically blended with polymers to impart flame retardant properties. Examples include halogenated hydrocarbons, metal oxides, particularly antimony oxide, and organic phosphorus compounds. To obtain useful flame retardance, however, fairly high concentrations of additives are necessary especially if dripping of molten polymer is to be obviated, and the mechanical properties of the polymer may be degraded as a consequence. For example, it is necessary to add 35% of a chlorinated paraffin wax/antimony oxide mixture to polyethylene to reduce the inflammability of the material sufficiently to prevent flaming droplets of molten polymer dripping from the burning mass. At such a concentration of antimony oxide, the material has considerable toxicity.

Materials are known which have the property of intumescence, that is, the property of swelling on heating, with the production of a non-inflammable foamed char of low thermal conductivity. Such materials have been applied to substrates as surface coatings in the form of resin-based paints. The active components usually comprise an organic material of high carbon content which chars, together with a foaming agent which generates inert gas on heating. A typical composition is pentaerythritol mixed with a diacyanodiamine, which produces a nitrogen blown foam on heating.

We have now found that intumescent materials may be incorporated in thermoplastics containing conventional flame retardants, with the advantage that the concentration of flame retardant necessary to prevent dripping is considerably lowered.

Accordingly, the present invention provides thermoplastic compositions, having fire resistant properties, which comprise mixtures of (1) a thermoplastic polymeric material, (2) a flame retardant additive and (3) an intumescent material.

Choice of suitable flame retardant additives usually depends upon the type of thermoplastic polymeric material with which it is to be blended. For example, polyolefins, such as polyethylene or polypropylene, may be combined with chlorinated paraffin waxes, with the addition of antimony oxide, whereas antimony oxide alone may be added to poly(vinyl chloride). Poly(methyl methacrylate) is usually blended with halogenated organic phosphates or phosphonates, and these compounds together with tetrabromoethane may also be used with polystyrene. A suitable intumescent material is a mixture of pentaerythritol polyurethane and melamine phosphate or a haloalkylphosphate.

The compositions of the present invention are prepared by mixing the various components as intimately as possible, for example, by grinding and/or milling, with or without the application of heat. The various components may be added in any convenient order.

The present invention is particularly advantageous for producing fire resistant compositions in which the polymeric material is a polyolefin, especially polyethylene. For polyolefins the preferred flame retardant additive is a mixture of equal parts of chlorinated paraffin wax and antimony oxide, and the preferred intumescent material is the mixture of 2 parts of pentaerythritol polyurethane and 1 part of melamine phosphate. The finished composition preferably contains from 5 to 50% of flame retardant additive and from 20 to 70% of intumescent material. For polyethylene, the optimum composition contains about 10–20% of preferred flame retardant additive, and 40–45% of preferred intumescent material. All parts and percentages are by weight.

Fire resistant compositions according to the present invention may be moulded into shaped articles but they are especially suitable for use as coatings. For example, a composition containing a polyolefin may be used to coat paper or other inflammable sheet material on one or both sides to produce a fire resistant laminate, suitable for use as a packaging material.

The invention is illustrated by the following Examples.

Three polyethylene compositions were prepared from a low density polyethylene, chlorinated paraffin wax, antimony oxide, pentaerythritol polyurethane and melamine phosphate in the amounts shown in the Table below. The pentaerythritol polyurethane and melamine phosphate were prepared as described by G. B. Verburg et al., J. Amer. Oil Chemists Soc. 41 (10), 670 (1964). The component materials were compounded using a two-roll mill at roll temperature of 140° and 150°C and the crepe was compression moulded at 150°C to a specimen 5 × 0.5 × 0.5. When subjected to the standard test for flammability of rigid plastics (ASTM D635-63), the specimens were judged to be "self-extinguishing". In addition they did not drip when a direct flame was applied to their surface, but formed a swollen carbonaceous crust.

By comparison, a composition prepared in an analogous way, but without pentaerythritol polyurethane or melamine phosphate, was judged to be self-extinguishing, but was found to drip when a flame was applied.

TABLE

| Component | Amount (parts by weight) | | |
|---|---|---|---|
| | Example 1 | Example 2 | Example 3 |
| Polyethylene | 51 | 40 | 31 |
| Chlorinated paraffin wax | 34 | 10 | 2.0 |
| Antimony oxide | 23 | 7 | 1.4 |
| Pentaerythritol polyurethane | 29 | 29 | 44 |
| Melamine phosphate | 14 | 14 | 22 |

What we claim is:

1. A coated product comprising a flammable substrate coated with a mixture of (1) a polyolefin selected from the group consisting of polyethylene and polypropylene (2) from 10–20% by weight of a flame retardant additive comprising a mixture of chlorinated paraffin wax and antimony oxide and (3) from 40–45% by weight of an intumescent material comprising a mixture of pentaerythritol polyurethane with melamine phosphate, said mixture being self-extinguishing and free from drip of molten polyolefin when a direct flame is applied thereto.

2. A coated product according to claim 1 comprising paper coated with said composition.

* * * * *